Aug. 26, 1969       J. M. LAZAR       3,463,176
FLUIDIC FUEL CONTROL SYSTEM
Filed Dec. 22, 1965                    2 Sheets-Sheet 1

*INVENTOR.*
JEFFREY M. LAZAR
BY
ATTORNEY

Aug. 26, 1969         J. M. LAZAR         3,463,176
FLUIDIC FUEL CONTROL SYSTEM
Filed Dec. 22, 1965                    2 Sheets-Sheet 2
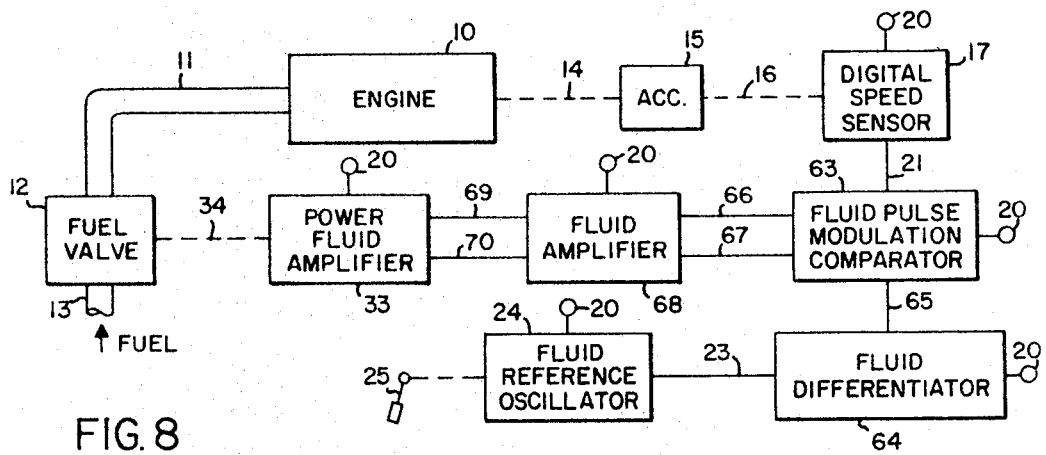
FIG. 8
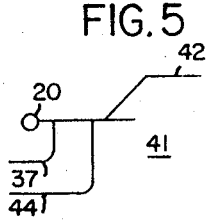
FIG. 4
FIG. 5
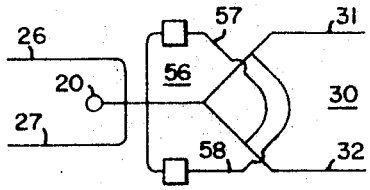
FIG. 3
FIG. 6
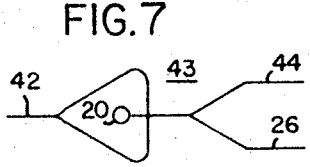
FIG. 7
FIG. 9
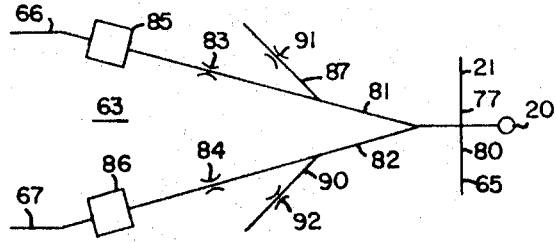
FIG. 10
INVENTOR.
JEFFREY M. LAZAR
BY George H. Field
ATTORNEY

United States Patent Office 3,463,176
Patented Aug. 26, 1969

3,463,176
FLUIDIC FUEL CONTROL SYSTEM
Jeffrey M. Lazar, St. Paul, Minn., assignor to Honeywell Inc., Minneapolis, Minn., a corporation of Delaware
Filed Dec. 22, 1965, Ser. No. 515,549
Int. Cl. F01c *21/12;* F15c *1/08;* G06m *1/12*
U.S. Cl. 137—36          7 Claims

ABSTRACT OF THE DISCLOSURE

Pure-fluid apparatus for controlling the fuel valve of an engine to maintain its speed at any defined value. In a first embodiment an up-down counter receives trains of fluid pulses from an adjustable reference oscillator and from a speed sensor driven by the engine. In a second embodiment, a fluid pulse modulation comparator receives the trains of fluid pulses. In each embodiment a fluid output is supplied to a power fluid amplifier, of such a sense and magnitude as to cause appropriate activation of the fuel valve.

---

This invention relates to the field of fluid systems and more particularly to apparatus for performing a supervisory function, relative to a variable quantity, in accordance with the relation between a pair of fluid pulse trains, one having a settable repetition frequency and the other having a repetition frequency which varies with the quantity being supervised. The quantity may be one of several parameters of a complex system and is disclosed in the present application, by way of illustration, as being the speed of an engine.

Figure 1:
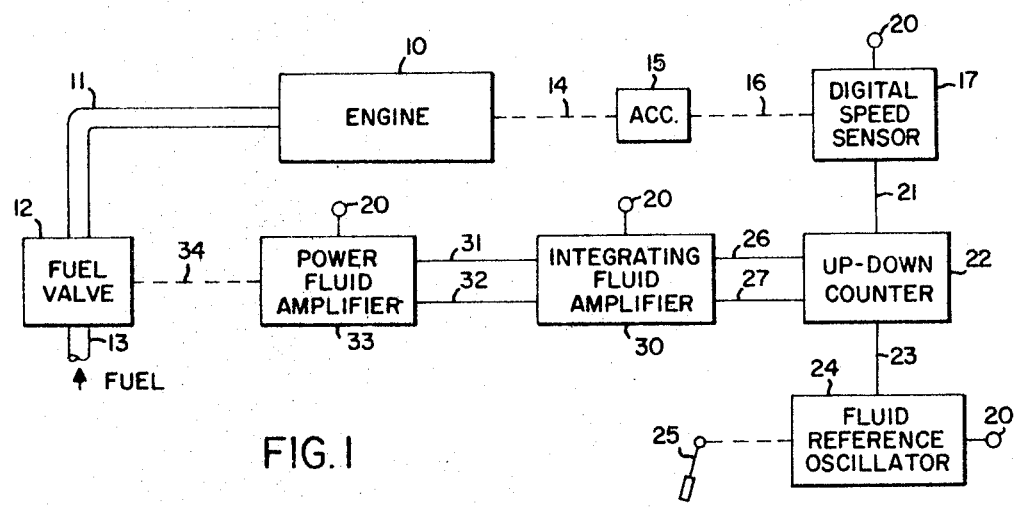
Figure 2:
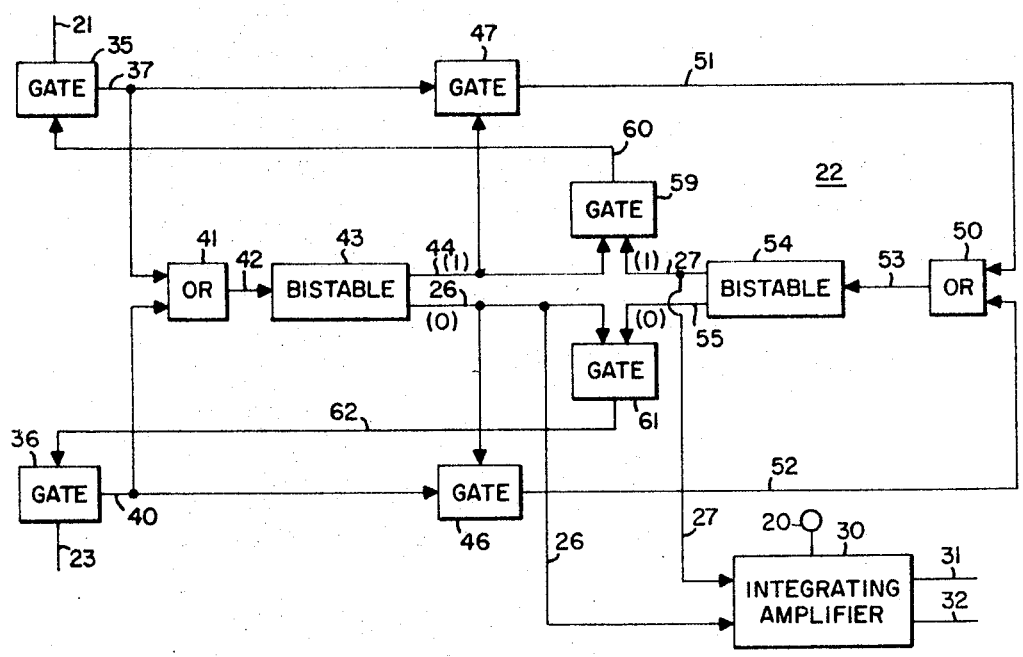

In the sub-joined drawing FIGURE 1 shows a supervisory invention embodying my invention, FIGURE 2 shows schematically an up-down counter used in the system show FIGURE 1, FIGURES 3, 4, 5, 6, and 7 of schematically certain pure fluid components represented by block diagrams in FIGURES 1 and 2, FIGURE 8 shows a second embodiment of the invention, and FIGURES 9 and 10 show schematically certain pure fluid components of FIGURE 8.

IN FIGURE 1 an engine 10 is shown as supplied through conduit 11 and a valve or throttle 12 with fuel from a conventional source indicated by the conduit 13. The engine drives a shaft 14 which supplies power to any suitable utilization device, and also acts through an accessory drive 15, which may comprise suitable gear transmission means, and a further shaft 16, to drive a pure fluid digital speed sensor 17. Power fluid for sensor 17 is supplied continuously at 20, and the sensor output at 21 comprises a train of fluid pulses having a repetition rate determined by the speed of the engine. Sensors of this type are known: one suitable form comprises an apertured wheel driven by shaft 16 and interrupting the flow of fluid from a nozzle on one side of the wheel to a receiving tube on the other side of the wheel.

The output of sensor 17 is supplied to a pure fluid-up-down counter 22, better shown in FIGURE 2, together with the output 23 of a pure fluid reference oscillator 24 receiving its power fluid at 20 and adjustable by a suitable manual control 25 to give a train of pulses having a repetition rate determined by the setting of control 25.

The output of counter 22 is a differential fluid signal at 26 and 27 and is supplied to a pure fluid integrating amplifier 30 better shown in FIGURE 3, and continuously supplied with power fluid at 20. The output of amplifier 30 appears as a differential fluid signal at 31 and 32 and is supplied to a power fluid amplifier 33, which is shown as controlling the operation of valve 12.

By way of illustration a mechanical connection 34 is shown between amplifier 33 and valve 12, but it will be appreciated that valve 12 itself may be a pure fluid device, so that the connection may be a fluid one, and that indeed an electrical rather than a mechanical interface may be used if desired.

Counter 22 is disclosed in more detail in FIGURE 2. Outputs 21 and 23 are normally transmitted through a pair of fluid gates 35 and 36 respectively, and appear as outputs 37 and 40; they are applied to a pure fluid logical OR 41, which isolates the outputs from one another, but transmits any pulse from either output, as at 42, to a pure fluid counter stage or bistable element 43 having first and second alternate states in which it gives sustained fluid outputs at 26 and 44, respectively. When the output is at 44, the count of element 43 is one, and when the output is at 26, the count of element 43 is zero. These outputs are transmitted to pure fluid gates 46 and 47 respectively, which are also connected to receive the pulse outputs of gates 36 and 35, also respectively. The operating time of members 41 and 43 is so chosen that the initial pulses from gates 36 and 35 have ceased before outputs 26 and 44 reach gates 46 and 47: however a second pulse from gate 35 is effective to cause any output 44 to be transmitted through gate 47 to a second pure fluid logical OR 50, as at 51, and a second pulse from gate 36 is effective to cause any output 26 to be transmitted through gate 46 to member 50, as at 52. Member 50 mutually isolates the fluid signals from gates 46 and 47 although either signal is transmitted, as at 53, to a second pure fluid counter or bistable element 54. Element 54, like element 43, has first and second alternate states in which it gives sustained fluid outputs at 55 and 27 respectively. When the output is at 27, the count of element 54 is one and when the output is at 55 the count of element 54 is zero. The apparatus described thus functions as a two stage binary counter which counts in either direction: each pulse from output 21 causes an up count and each pulse from output 23 causes a down count. The available counts are 00, 01, 10, and 11.

Integrating fluid amplifier 30 is connected to receive outputs 26 and 27 differentially, and is shown in more detail in FIGURE 3 to comprise a fluid amplifier 56 having a power inlet continuously energized as at 20, a pair of control ports connected to receive outputs 26 and 27, and a pair of outlet ports supplying outputs 31 and 32: integration is accomplished by cross connected feedback loops 57 and 58 including fluid capacitors as necessary to give a desired time constant.

Returning to FIGURE 2, a pure fluid gate 59 is connected to elements 43 and 54 and supplies an output at 60 when signals are at both 44 and 27: the output from gate 59 is supplied to gate 35 and acts to inhibit the gate, thus preventing the transmission to elements 41 and 47 of any further pulses acting in the first direction. Similarly a pure fluid gate 61 is connected to elements 43 and 54 and supplies an output at 62 when signals are at both 26 and 55: the output from gate 61 is supplied to gate 36 and acts to inhibit the gate, thus preventing the transmission to elements 41 and 46 of any further pulse in the second direction.

For the sake of completeness FIGURE 4 illustrates a fluid element used at 35 and also useable at 36, 59, and 61, FIGURE 5 illustrates a typical fluid element used at 41 and also useable at 50, FIGURE 6 illustrates a typical fluid element used at 47 and also useable at 46 and FIGURE 7 illustrates a typical fluid element used at 43 and also useable at 54.

For the ideal condition in which the engine of FIGURE 1 is running at the exact speed called for by the setting of control 25, the repetition frequencies of the two pulse trains are exactly the same and pulses at 21 alternate with pulses at 23 so that the count oscillates between 01 and 10. For this condition integrating amplifier 30 gives a mean control signal of zero. However if the engine speed differs slightly from that desired, the repetition frequency of one pulse train becomes greater than that of the other, so that eventually two successive pulses from the same source are received by the counter and the count now oscillates between 00 and 01. Integrating amplifer 30 now gives an increasing output of a first sense at 31 and 32, which is used to adjust the fuel supply to the engine by means of valve 12, so as to restore the engine speed to that selected.

If the engine speed deviates still further from that selected a second duplication of pulses from one source occurs, which would transfer the count from 00 to 11: this in turn would act through amplifier 30 to reverse the sense of the correction made by valve 12 and thus would make this system wholly inoperative. This could of course be prevented by providing a sufficiently large number of binary counter stages to absorb the largest count which could result from any possible error in engine speed. I prefer to disable the appropriate one of gates 35 and 36 whenever the count reaches 00 or 11 respectively, and this function is performed by gates 59 and 61.

FIGURE 8 shows a modification of my invention: portions performing the same function as those in FIGURE 1 are identified with like reference numerals and will not be described further. In FIGURE 8 the output 21 of sensor 17 is fed directly to a pure fluid pulse modulation comparator 63, while the output 23 of oscillator 24 is fed to comparator 63 through a pure fluid differentiator 64 having an output 65. Comparator 63 gives a differential fluid output at 66 and 67 which is supplied to a fluid amplifier 68: differentiator 64, comparator 63, and amplifier 68 are continuously supplied with power fluid at 20. The differential output of amplifier 68 appears at 69 and 70 and is supplied to power amplifier 33 for controlling fuel valve 12.

Fluid differentiator 64 may be of any suitable type: one embodiment is shown in FIGURE 9 to comprise a fluid amplifier having a power inlet continuously supplied with power fluid at 20, a pair of control ports 71 and 72, and a pair of outlet ports 73 and 74, the former being connected to provide output 65. The oscillator output 23 is supplied to control port 71 through a fluid resistor 75, and to control port 72 through a conduit 76 which may include a fluid capacitor if this is desired.

Comparator 63 is shown in FIGURE 10 to comprise a fluid amplifier having a power inlet continuously supplied with power fluid at 20, a pair of control ports 77 and 80, a pair of outlet ports 81 and 82 including fluid resistors 83 and 84 and fluid capacitors 85 and 86, and a pair of vent ports 87 and 90 including fluid resistors 91 and 92. Outputs 21 and 65 from sensor 17 and differentiator 62 are supplied to control ports 77 and 80, and outputs 66 and 67 from comparator 63 are taken from capacitors 85 and 86, all respectively.

Comparator 63 functions generally as a bistable switch. A fluid pulse at control port 77 deflects the stream to emerge through restrictions 84 and 92. The fluid flows into capacitor 86 faster than it can flow out at 67, and the capacitor starts to charge. Now when a pulse is supplied at control port 80 the flow is deflected to emerge through restrictions 83 and 91. Capacitor 85 starts to charge, and capacitor 86 can now start to discharge through resistors 84 and 92 as well as at 67. Since continuous trains of pulses are supplied to the control ports, fluid charges both capacitors alternatively, and a pressure difference appears across 66 and 67 which is a function of the difference between the repetition rates of the two pulse trains.

I claim as my invention:

1. A fluidic control system for an internal combustion engine having associated therewith a variable condition which is dependent on fuel flow to the engine, said fluidic control system comprising:

condition responsive means giving a first train of fluid pulses having a repetition frequency which varies with the variable condition;

a variable fluid oscillator giving a second train of fluid pulses having a repetition frequency which may be set at a value within a predetermined range of such values;

control signal means connected to said responsive means and said variable fluid oscillator for giving a fluid output determined by the relationship between said trains of pulses;

fuel valve means operable to regulate fuel flow to said engine in response to a fluid signal; and means connecting said control signal means to said fuel valve means so as to convey the fluid output signal thereto, thereby controlling the variable condition.

2. Apparatus according to claim 1 in which said control signal means includes a fluid up-down counter having signal output means, a first input connected to said condition responsive means and a second input connected to said variable fluid oscillator, said fluid up-down counter counting up if the repetition frequency of the train of fluid pulses supplied to the first input exceeds the repetition frequency of the train of fluid pulses supplied to the second input, said fluid up-down counter counting down if the repetition frequency of the train of fluid pulses supplied to the second input exceeds the repetition frequency of the train of fluid pulses supplied to the first input.

3. Apparatus according to claim 2 further including an integrating fluid amplifier connecting the signal output means of said fluid up-down counter to the fuel valve means of said engine.

4. Apparatus according to claim 1 in which the last named means includes a fluid up-down counter comprising first and second bistable means; means, including first gating means, for normally supplying said first train of pulses to said first bistable means; means, including second gating means, for normally supplying said second train of pulses to said first bistable means; means including third gating means, connecting said first gating means and said first bistable means to said second bistable means; means, including fourth gating means, connecting said second gating means and said first bistable means to said second bistable means; fifth gating means, connected to said first and second bistable means and to said first gating means, for inhibiting normal operation of said first gating means when said bistable means are simultaneously in first predetermined states; sixth gating means, connected to said first and second bistable means and to said second gating means, for inhibiting normal operation of said second gating means when said bistable means are simultaneously in second predetermined states; and output means connected to said first and second bistable means for providing said fluid output.

5. Apparatus according to claim 1 in which the last named means includes a fluid pulse modulation comparator comprising a fluid amplifier having a continuously energized power fluid port, a pair of oppositely acting control ports, an interaction chamber, a pair of opposite outlet ports; and a pair of vent ports connected to said outlet ports; fluid resistors in said outlet and vent ports downstream from their points of connection; and a pair of capacitors in said outlet ports downstream from said fluid resistors.

6. A fluid pulse modulation comparator comprising a fluid amplifier having a continuously energized power fluid inlet port, a pair of oppositely acting control ports, an interaction chamber; a pair of opposite outlet ports, and a pair of vent ports connected to said outlet ports; fluid resistors in said outlet and vent ports downstream from their points of connection; and a pair of fluid capacitors in said outlet ports downstream from said fluid resistors.

7. An up-down counter comprising, in combination: first and second bistable means; means, including first gating means, for normally supplying a first train of pulses to said first bistable means; means, including second gating means, for normally supplying a second train of pulses to said first bistable means; means, including third gating means, connecting said first gating means and said first bistable means to said second bistable means; means, including fourth gating means, connecting said second gating means and said first bistable means to said second bistable means; further gating means connected to said first and second bistable means and to at least one of said first gating means, for inhibiting operation thereof whenever said bistable means are simultaneously in predetermined states; and output means connected to said first and second bistable means.

References Cited

UNITED STATES PATENTS

| | | | |
|---|---|---|---|
| 3,224,674 | 12/1965 | Warren | 235—201 |
| 3,292,648 | 12/1966 | Colston | 137—36 |
| 3,238,959 | 3/1966 | Bowles | 137—81.5 |
| 3,339,571 | 9/1967 | Hatch | 137—81.5 |

OTHER REFERENCES

"Proceedings of the Fluid Amplification Symposium, May 1964," vol. II, Harry Diamond Laboratories, Washington, D.C., pp. 2–4.

Boothe: "Feasibility Study of a Fluid Amplifier Steam Turbine Speed Control," Fluid Amplification Symposium, Harry Diamond Laboratories, Washington, D.C., vol. II, May 1964, pp. 377–385.

RICHARD B. WILKINSON, Primary Examiner

LAWRENCE R. FRANKLIN, Assistant Examiner

U.S. Cl. X.R.

137—81.5; 235—201